United States Patent [19]
Floris et al.

[11] Patent Number: 5,111,700
[45] Date of Patent: May 12, 1992

[54] METHOD AND APPARATUS FOR OBTAINING ELECTRICAL SIGNALS CORRELATED WITH THE POSITION OF A MASS OF MERCURY IN INSTRUMENTS AND THE LIKE

[76] Inventors: Pier-Luigi Floris; Yvonne O'Toole, both of Via Pitzolo 23, I - 09100 Cagliari, Italy

[21] Appl. No.: 555,791

[22] Filed: Jul. 24, 1990

Related U.S. Application Data

[60] Continuation of Ser. No. 399,421, Aug. 28, 1989, abandoned, which is a continuation of Ser. No. 206,921, May 31, 1988, abandoned, which is a continuation of Ser. No. 45,236, May 1, 1987, abandoned, which is a continuation of Ser. No. 765,538, Aug. 14, 1985, abandoned, which is a division of Ser. No. 515,526, Jul. 20, 1983, Pat. No. 4,554,535.

[30] Foreign Application Priority Data

Jul. 27, 1982 [IT] Italy ................. 9482 A/82

[51] Int. Cl.$^5$ ............................................. G01L 9/10
[52] U.S. Cl. ...................................................... 73/749
[58] Field of Search ............ 73/749, 752; 33/366; 340/689

[56] References Cited

U.S. PATENT DOCUMENTS

| | | | |
|---|---|---|---|
| 3,140,606 | 7/1964 | Kramer et al. | 73/313 |
| 3,218,863 | 11/1965 | Calvert | 73/749 |
| 3,407,664 | 10/1968 | Glassey | 73/749 |

FOREIGN PATENT DOCUMENTS

| | | | |
|---|---|---|---|
| 1363419 | 5/1964 | France | 73/749 |
| 0618665 | 8/1978 | U.S.S.R. | 73/749 |

*Primary Examiner*—Donald O. Woodiel
*Attorney, Agent, or Firm*—Stevens, Davis, Miller & Mosher

[57] ABSTRACT

A method of obtaining electrical signals corresponding to the position of a mercury mass movable within a vessel, characterized by the fact that the position of the moving mass within the vessel is detected by means of at least one electromagnetic proximity sensor, specifically an induction proximity sensor, that is a sensor adapted to producing an electrical signal when approached by a metal object or when approaching the same.

2 Claims, 2 Drawing Sheets

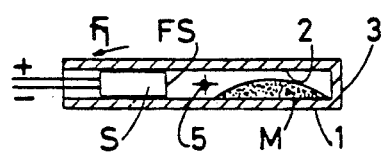
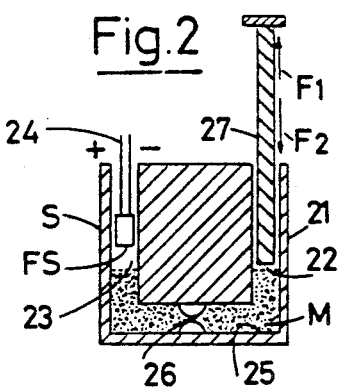
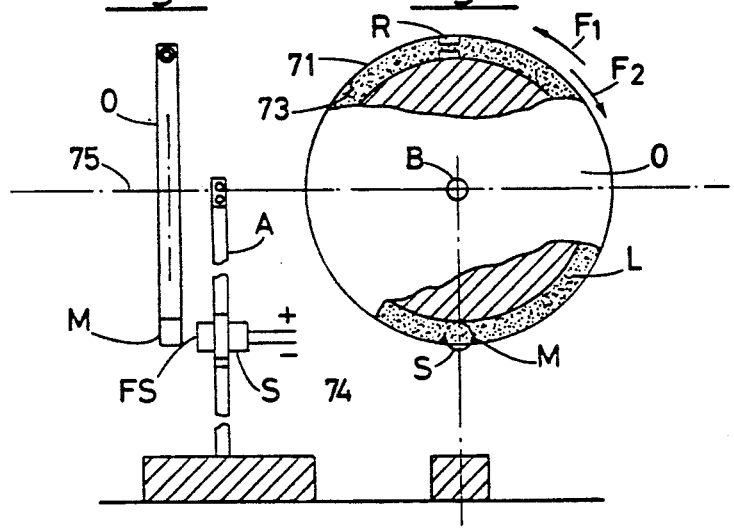
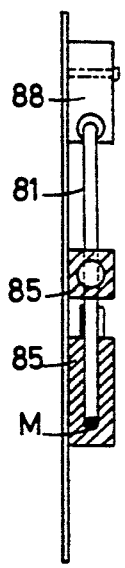
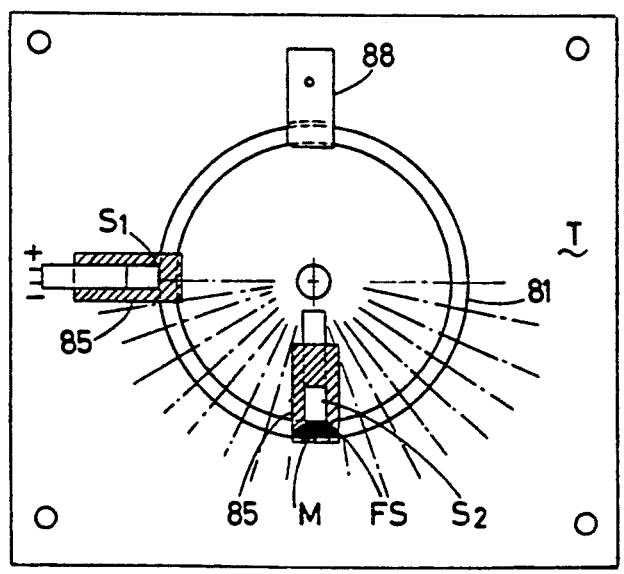

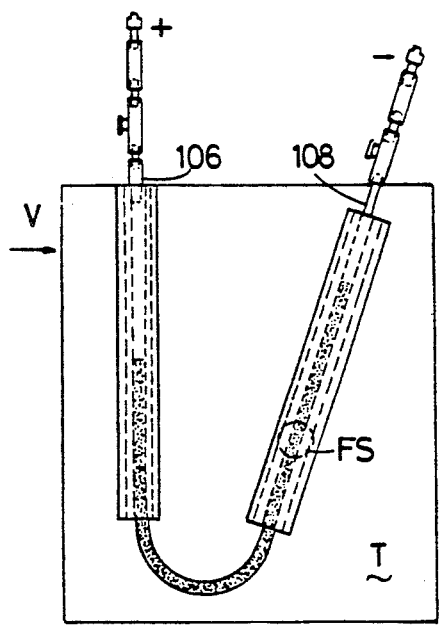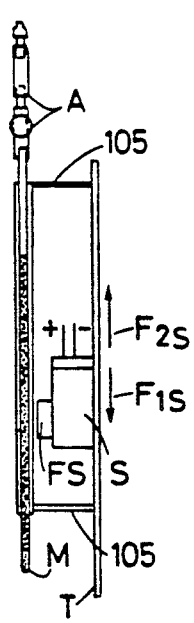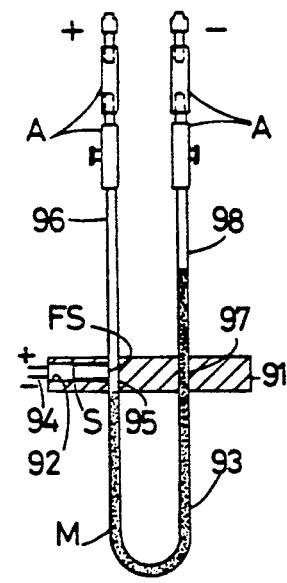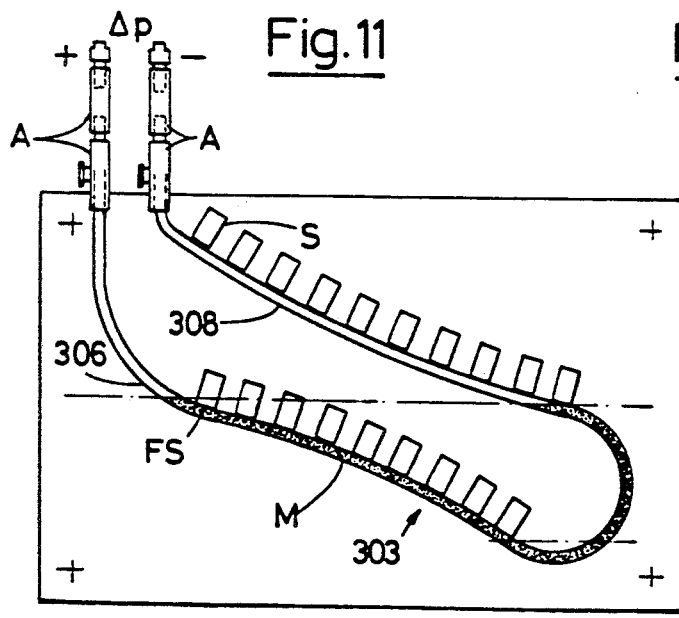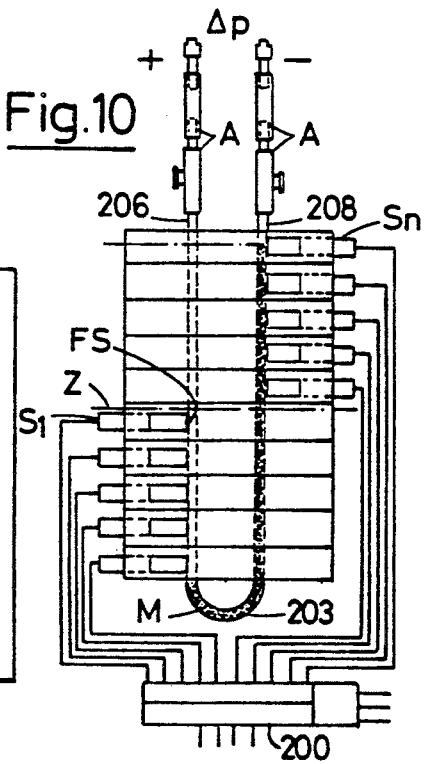

METHOD AND APPARATUS FOR OBTAINING ELECTRICAL SIGNALS CORRELATED WITH THE POSITION OF A MASS OF MERCURY IN INSTRUMENTS AND THE LIKE

This application is a continuation of application Ser. No. 399,421, filed Aug. 28, 1989, now abandoned, which is a continuation of application Ser. No. 206,921, filed May 31, 1988, now abandoned, which is a continuation of application Ser. No. 045,236, filed May 1, 1987, now abandoned, which is a continuation of application Ser. No. 765,538, filed Aug. 14, 1985, now abandoned, which is a Divisional of application Ser. No. 515,526, filed Jul. 20, 1983, now U.S. Pat. No. 4,554,535.

A method is disclosed for producing electrical signals indicating the position of a mercury mass in measuring instruments such as thermometers, barometers, manometers, inclinometers and the like.

According to the invention, the positions of mercury mass are detected and sensed by one or more electromagnetic proximity sensors of metals, the mercury mass being never passed through by electric current.

Several applications of the above inventive concept are shown among which a compact fluid-tight vessel or capsule in which a mass of mercury and a proximity sensor are included; which device, when mounted on a tiltable object, is adapted for producing a signal, or respectively no signal, when the object reaches a certain angular position with respect to the horizontal and no signal or respectively signal of another kind when the attitude of the object changes.

The object of this invention is a method and an apparatus for obtaining electrical signals which indicate the position and consequently the movement of a mass of mercury without resorting to an electrical current conducted by the same mass.

According to the invention a position or more positions of a mercury mass are detected by one or more proximity sensors which are located along the path of the mercury movement.

As known, an induction proximity sensor or induction proximity detector is an electric device which produces an electrical signal when approached by a metal object or when approaching a metal object. It comprises an oscillator for generating an electromagnetic field which is changed by ferrous or nonferrous metal objects moving within said field. The sensor oscillator is contained in a compact head usually cylindrical but also of other shapes, such as forks etc. With reference to the usual cylindrical shape, the oscillator coil is located near one of the cylinder flat ends which is therefore called the active face of the sensor and the electromagnetic field radiated thereby is symmetrical with respect to the cylinder axis. The sensor sensitivity can be defined as the distance at which the sensor emits a signal when a standard metal object moves towards or away therefrom.

Such distance is measured in the direction of the axis of the sensor when this is cylindrical and the object is approached in the direction of said axis, or in a direction at right angle to said axis when the object is approached transversely to said axis. When the object is approached diagonally the distance will be measured as the resultant of the above two movements.

A relevant characteristic of the sensor is the distance from the position where the sensor emits the signal corresponding to the object presence while this approaches the sensor (operating distance) and the position where said signal stops while the object is moving away from the sensor (release distance).

Several small-size proximity sensors are available on the market, the cylindrical heads of which have diameters of the order of 5 mm with sensing distance of the order of 1 mm, the interval between the operating distance and the release distance being of the order of some tenths of millimeter.

According to an application of the invention, an elongated vessel is partially filled with mercury and at least one proximity sensor is fitted through the vessel walls. When the vessel is tilted in a vertical plane, the mercury mass is moved by gravity towards or away from the sensor active face. A signal will thus be emitted by the sensor which signifies the change of the vessel attitude. This signal from the sensor will be used for actuating a relay or similar devices.

According to another application of the invention an instrument for measuring differential pressures through the difference of the levels of two mercury columns in a U-shaped tube—that is a differential manometer—is equipped with one or more proximity sensors located near the tubular column or at contact therewith and the signals from the sensor or sensors will be fed to electromagnetic apparatuses for obtaining analogical or digital readings.

According to a further application of the invention, a small mass of mercury is contained in a tubular ring made of non-metallic material, which ring is equipped with a proximity sensor of which the active face is at contact with the tube wall and which is displaceable along the periphery thereof. Whenever said tubular ring is attached to an object which is subject to swing in a vertical plane the inclination of the object can be measured by displacing the proximity sensor head along the tube until it senses the presence of the mercury mass.

Several other applications can be envisaged, some of which will be described and claimed hereinafter for a better understanding of the invention, with reference to the attached drawings.

In the drawings:

FIG. 1 shows a longitudinal cross section of a device according to the invention for indicating the position changes of an object tiltable in a vertical plane;

FIG. 2 shows a vertical cross section of a device according to the invention for indicating the position of a moving mechanical member;

FIG. 3 shows a vertical cross section of a device according to the invention for indicating the change of a rotatable object from its stationary state;

FIG. 4 shows a front view of the device of FIG. 3 with portions thereof removed for better clarity;

FIG. 5 shows a front view of a device according to the invention for measuring the inclination of an object to which the device is attached;

FIG. 6 shows a side view of the device of FIG. 5;

FIG. 7 shows a schematic view of a double-leg mercury-column manometer with vertical legs equipped with a sensor according to the invention;

FIG. 8 shows a schematic view of a double-leg mercury-column manometer having a slant leg equipped with a sensor according to the invention;

FIG. 9 shows a side view along arrow V of the manometer of FIG. 8;

FIG. 10 shows a schematic view of a double-leg mercury-column manometer with vertical legs equipped with a row of sensors along both legs according to the invention;

FIG. 11 shows a schematic view of a double-leg mercury manometer with curved legs which are each equipped with a plurality of sensors according to the invention.

With reference to FIG. 1, a device is illustrated therein which comprises a cylindrical or prismatical body 1 provided with an axial bore 2, into one end of which the head of a proximity sensor S is fluid-tight fitted with its active face FS directed towards the other end of the body which is fluid-tight closed by a wall 3.

The space between sensor S and wall 3 contains a mass of mercury M which fills only partially said bore.

Whenever body 1 is rotated in a vertical plane, for instance about axis 5 of the figure, the mass of mercury M is caused to move towards or away from sensor S by gravity.

As illustrated in FIG. 1, the axis of body 1 is horizontal and the mercury mass is indifferently positioned within bore 2. Should body 1 be tilted in the direction of arrow $f_1$ then the mercury mass will move and collect against the active face of sensor S and a corresponding signal will be emitted thereby which can be used for controlling a relay and closing, for instance, a circuit. On the other hand, when body 1 is rotated contrarywise of arrow $f_1$, the mercury mass will move towards wall 3 and sensor S will emit a different signal by which said relay will be actuated for instance to open said circuit. It is to be noted that in no position of body 1 and of mercury mass M this will be passed through by electric power. This is a great advantage in comparison with the usual tilt switches when a circuit is closed through the mercury mass and therefore sparks and heat are generated thereby. The device of FIG. 1 can assume many forms.

The concept of this invention is further realized with the device of FIG. 2, which is a means for obtaining an electrical signal correlated with the movement of a mechanical member to actuate a relay or a switch, for instance a limit switch, of said moving member.

The device comprises a stationary block 21 provided with two vertical bores 22, 23 which are connects together at their lower ends by a horizontal duct 25. Bores 22, 23 are partially filled with mercury M of which the meniscuses within the bores are at the same level, due to the principle of communicating vessels.

A plunger 27 is inserted with large clearance into one (22) of the bores to float on the mercury mass. The mercury meniscuses will reach the same level in both the bores. A proximity sensor S is introduced into the other bore 23 with its active face FS at a level higher than the mercury meniscus in the same bore. Whenever plunger 27 is depressed in the direction of arrow $F_2$ by the mechanical member—not shown—and sunk further into the mercury within bore 22, the level of mercury within bore 23 will rise and approach the active face FS of proximity sensor S and cause a signal to be emitted from the latter for actuating, for instance, a relay or a switch through leads 24. The action of the above device can be delayed by a calibrated obstruction 26 with which duct 25 is provided. According to a variant of the same device, sensor S can be fitted tightly into bore 23 and plunger 27 can be made to slide fluid-tight into bore 22. In such case, a helical spring—not shown—will be provided around the plunger for restoring it to its upward position according to arrow $F_1$ when the depressing force by the moving mechanical member is relieved.

FIGS. 3 and 4 show an application of the concept of this invention whereby the change from a state of rest of a mechanical member such as disk or a pulley is perceived.

A non metallic disk O rotatable about a horizontal axis 75 is surrounded by a non metallic tube 71 within which a mass M of mercury is contained which will collect at the lower section of the tube when disk O is at rest.

A proximity sensor S, which can be supported on a stand A is located beside tube 71 at the level of the lowermost position of the mercury mass M. The active face FS of sensor S faces the side of tube 71 at short distance therefrom. When disk 0 is at rest, the mercury mass M will be in front of the sensor active face FS and a signal will be emitted by sensor S' through wires 74 denoting the rest state of the disk. A different signal will be emitted when the respective positions of the mercury mass and of sensor S will change due to any movement of disk O and the consequent dragging of the mercury mass by friction.

In order to aid such dragging of the mercury by wall 73 of tube 71, this can be filled with a thick liquid L in addition to the mercury mass.

An instrument is shown by FIGS. 5 and 6 which serves for detecting and indicating the angular positions of an object tiltable about a horizontal axis, such as an inclinometer.

A ring shaped non metallic tube 81 is attached by means of clamps 88 to a plate integral with said object or fastened thereto. A mercury mass M is contained in tube 81 and one or more proximity sensor holders 85 are mounted on tube 81 to slide along the same. A proximity sensor S is seated in each holder 85 and with its active face towards tube 81. Each sensor holder 85 is set along tube 81 at an angular position which is of interest.

When due to the tilting of the object to which the instrument is attached a sensor is moved to pass in front of the mercury mass, a signal will be emitted by that particular sensor which signifies that the object to which ring 81 is attached has tilted with respect to the horizontal through an angle corresponding to the angular position of the sensor along tube 81.

Only two sensors $S_1$ $S_2$ are shown in FIGS. 5, 6 which are set at ah angle of 90 deg between each other. Obviously many other sensors can be used when the tilting of the object concerned is to be followed closer by.

FIGS. 7–10 show various cases where the concept of this invention is applied for obtaining electrical signals corresponding to the meniscus levels of a mercury column in a manometer.

In FIG. 7 a U-shape manometer is formed with a plastic tube 93 with two upright legs 96, 98 which are fitted through a pair of holes 95, 97 of a block 91 slidable along them. Block 91 is provided with a receptacle 92 into which a proximity sensor S is received with its active face FS slidably contacting the wall of tube 93.

The manometer legs 96, 98 are connected to respective pressure sources of which the pressure difference is to be measured. Such pressure difference, as known, will cause the mercury meniscuses to move, that is to go down in leg 96 connected to the higher pressure space and to rise in leg 98. When passing in front of the sensor active face FS, the mercury meniscus in leg 96 will cause the sensor to emit a signal signifying that the mercury meniscus is at the same level as the sensor.

The manometer thus equipped has the advantage of affording a visual indication of the mercury level and at the same time of providing an electrical signal for actuating, for instance, a relay or similar equipment.

In the case of an inclined-tube manometer, as shown in FIGS. 8,9, one, 106, of the legs is vertical and has a larger cross section than the inclined leg 108.

The manometer legs are supported on a vertical board T by means of brackets 195, which keep such legs distant from the table enough for inserting a proximity sensor between the manometer and the supporting board. The sensor will be slidable along the inclined leg 108 of the manometer by means not shown as indicated by arrows $f_1 S$ and $f_2 S$. The sensor active face FS will be directed toward the inclined leg of the manometer at short distance therefrom.

FIG. 10 shows a differential manometer similar to that of FIG. 7—that is comprising a U-shaped tube 203—but with a plurality of proximity sensors $S_1-S_n$ distributed along each of the manometer legs. The leg 208, connecting with the source of lower pressure, is equipped with sensors along the section thereof above the line Z of equal pressure of the sources with which the two legs connect, while the other leg 206 is equipped with sensors along its section below line Z. Thanks to the small size of the sensors presently available, a substantially continuous reading of the pressure difference can be obtained between the two sources with which the two legs of the manometer connect. The electric signals from proximity sensors $S1_1-S_n$ can be fed to an electronic apparatus 200 for conversion into analogical or digital form.

FIG. 11 shows a differential manometer usable as a flowmeter, which is equipped with proximity sensors according to the invention. It comprises a tube 303 attached to a vertical board and coplanar therewith and consisting of two curved legs, an upper one 308 and a lower one 306 connected to one another at their lower ends. Both the tube legs are curved according to a parabola, however the parabola segment according to which the upper leg is curved is downwards convex, while the lower leg 206 is upward convex. The reason of such outline of tube 303 is as follows.

The use of the above manometer is for measuring the flow of a fluid in a pipe—not shown—by measuring the drop of pressure caused by an obstruction in said pipe, the lower leg 306 of the manometer being connected to the pipe upstream of the obstruction and the upper leg 308 being connected to the same pipe but downstream of the obstruction, both legs sloping down from the respective connections with said pipe.

As known the pressure drop across the pipe obstruction is proportional to the square of the fluid velocity and then to the square of the fluid rate, so, when a manometer with vertical straight legs is used, the increase of the distance between the levels of the two mercury meniscuses corresponding to a given increment of flow rate measured along the manometer legs will not be the same at different flow rates, but will be greater at higher flow rates. However a constant increase of the meniscuses distance along the manometer legs for a given increment of the flow rate can be obtained by curving the manometer legs as above described.

This is a very convenient artifice in the case of the present invention because by positioning a series of proximity sensors along the manometer tube at regular distances from one another, a constant increment of the fluid rate can be detected by two successive sensors. Furthermore, according to the invention, the proximity sensors are so distributed along the respective manometer legs, that the sensors of one leg are offset with respect to those of the other leg, so that, when the mercury meniscus of one leg is between two successive sensors, the meniscus of the other leg is in front of a sensor. In this way a double number of sensors can be used with respect to those which can be received along a single leg of the tube and more minute readings of the flow rate can be obtained thereby.

What is claimed is:

1. A differential manometer comprising a U-shaped two-section tube of non metallic material, each section of which is connectable to one of two pressure sources, a mercury mass within a portion of said tube movable due to the difference between said pressure sources, both said tube sections being equipped each with a series of metal proximity sensors the sensors of one of the tube sections being offset with respect to the sensors of the other section in order to uninterruptedly emit a variable signal of proximity when a meniscus of the mercury mass in the other section is midway between two successive sensors along the same section.

2. A method of generating electrical signals comprising moving closer relative to each other at least one of a mercury mass movable within a container and an induction proximity sensor unit, said container being a differential manometer comprising a U-shaped two-section tube of non-metallic material, each section of which is connectable to one of two pressure sources which moves said mercury mass within a portion of said tube due to a difference between pressure sources, the method including providing said unit with a series of induction proximity sensors positioned along each tube section and offsetting the sensors of one tube section with respect to the sensors of the other section whereby movement of a meniscus of said mercury mass will uninterruptedly emit a variable signal of proximity when another meniscus of said mercury mass in one section is midway between successive sensors in the same section.

* * * * *